United States Patent
Hui

(10) Patent No.: US 11,285,833 B2
(45) Date of Patent: Mar. 29, 2022

(54) SYSTEM AND METHOD FOR CHARGING ELECTRIC VEHICLES

(71) Applicant: The University of Hong Kong, Pokfulam (HK)

(72) Inventor: Shu Yuen Ron Hui, Shatin (HK)

(73) Assignee: The University of Hong Kong, Pokfulam (HK)

( * ) Notice: Subject to any disclaimer, the term of this patent is extended or adjusted under 35 U.S.C. 154(b) by 180 days.

(21) Appl. No.: 16/494,895

(22) PCT Filed: Mar. 22, 2018

(86) PCT No.: PCT/CN2018/079960
§ 371 (c)(1),
(2) Date: Sep. 17, 2019

(87) PCT Pub. No.: WO2018/171658
PCT Pub. Date: Sep. 27, 2018

(65) Prior Publication Data
US 2020/0094700 A1    Mar. 26, 2020

Related U.S. Application Data

(60) Provisional application No. 62/474,732, filed on Mar. 22, 2017.

(51) Int. Cl.
*B60L 53/39*    (2019.01)
*B60L 53/60*    (2019.01)
(Continued)

(52) U.S. Cl.
CPC ............. *B60L 53/39* (2019.02); *B60L 53/60* (2019.02); *H02J 7/025* (2013.01); *H02J 50/10* (2016.02); *H02J 50/70* (2016.02); *H02J 50/90* (2016.02)

(58) Field of Classification Search
CPC . B60L 53/39; B60L 53/60; H02J 7/025; H02J 50/10; H02J 50/70; H02J 50/90;
(Continued)

(56) References Cited

U.S. PATENT DOCUMENTS

2014/0035526 A1   2/2014 Tripathi et al.
2016/0272074 A1*  9/2016 McGrath ................. B60L 53/14
(Continued)

FOREIGN PATENT DOCUMENTS

| CN | 103326447 | 9/2013 |
| CN | 103633697 | 3/2014 |
| CN | 104135058 | 11/2014 |

*Primary Examiner* — Paul Dinh
(74) *Attorney, Agent, or Firm* — Renner, Kenner, Greive, Bobak, Taylor & Weber

(57) ABSTRACT

The present invention provides a method for charging an electric vehicle. The method includes two steps. The first step is to move at least one of a transmitter coil of a charger and a receiver coil arranged at an upper end of a chassis of an electric vehicle relative to the other. The second step is to align the transmitter coil with the receiver coil such that the transmitter coil is arranged above and proximal to the receiver coil. The present invention also provides an electric vehicle arranged to be charged by the above method, a method for manufacturing such electric vehicle, and a charger or charging station that is arranged to charge electric vehicles using the above method.

32 Claims, 7 Drawing Sheets

(51) Int. Cl.
*H02J 7/02* (2016.01)
*H02J 50/70* (2016.01)
*H02J 50/10* (2016.01)
*H02J 50/90* (2016.01)

(58) Field of Classification Search
CPC ......... Y02T 90/12; Y02T 90/14; Y02T 10/70; Y02T 10/7072
USPC .......................................................... 320/109
See application file for complete search history.

(56) References Cited

U.S. PATENT DOCUMENTS

| | | | |
|---|---|---|---|
| 2017/0136882 A1* | 5/2017 | Ricci | B60L 3/0015 |
| 2018/0339600 A1* | 11/2018 | Kang | B60L 53/122 |
| 2019/0326784 A1* | 10/2019 | Lee | H02J 50/12 |

* cited by examiner

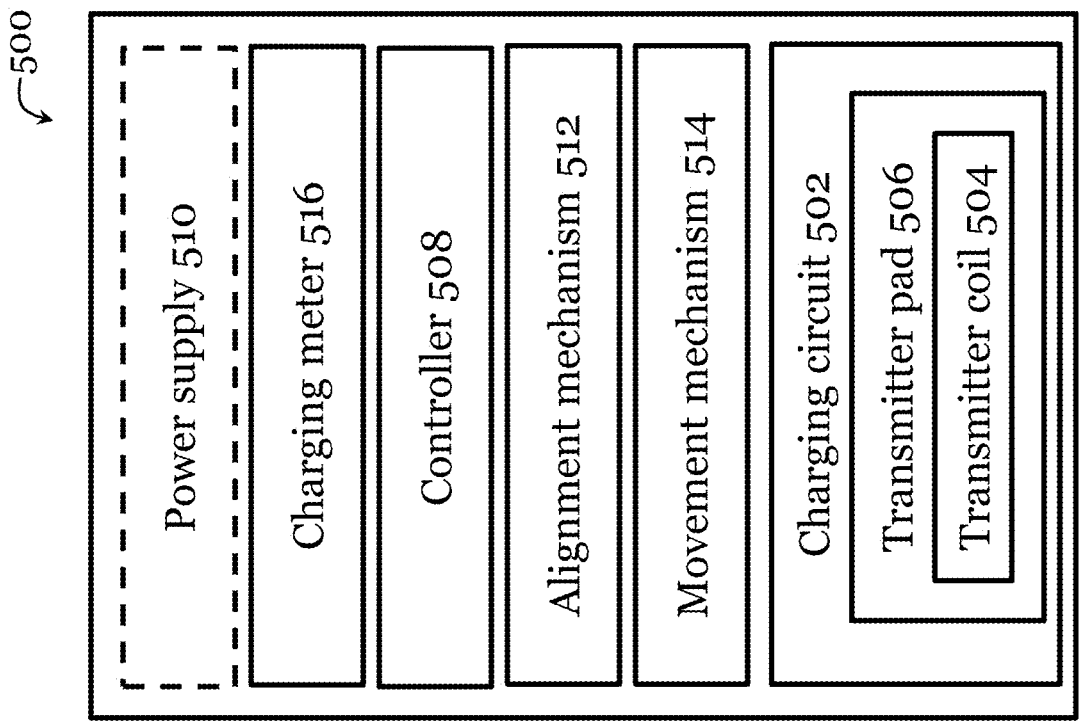
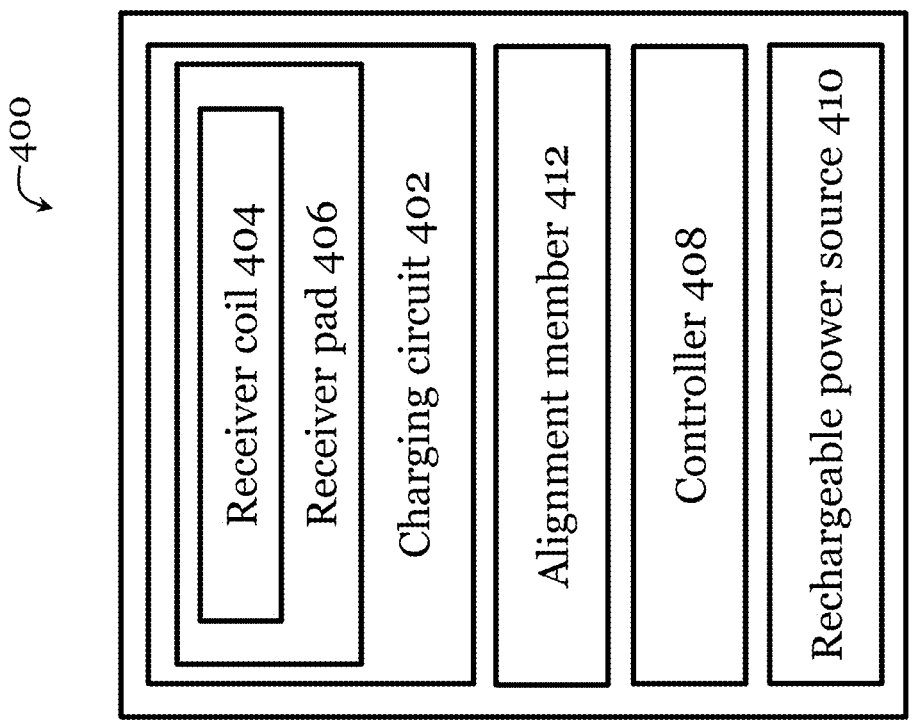
Figure 5
Figure 4

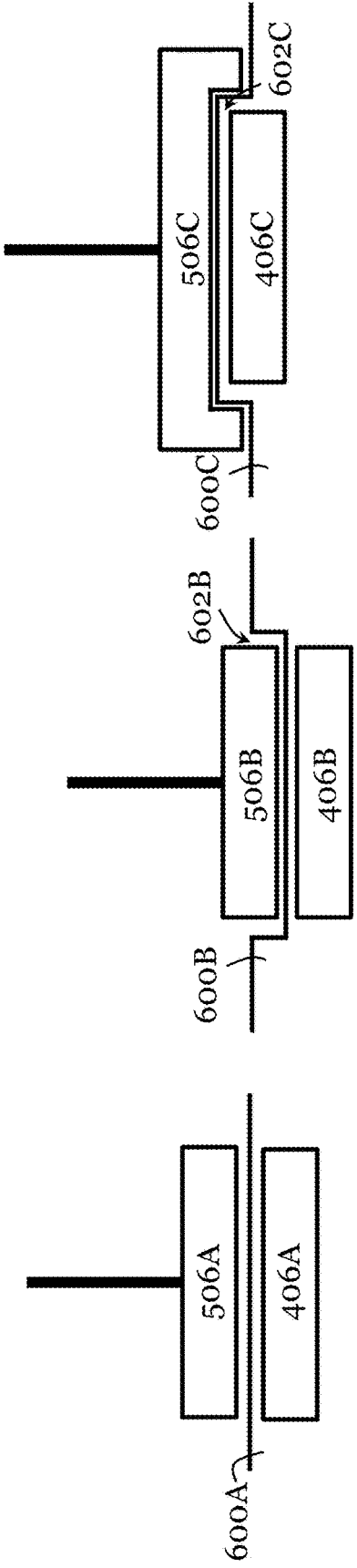
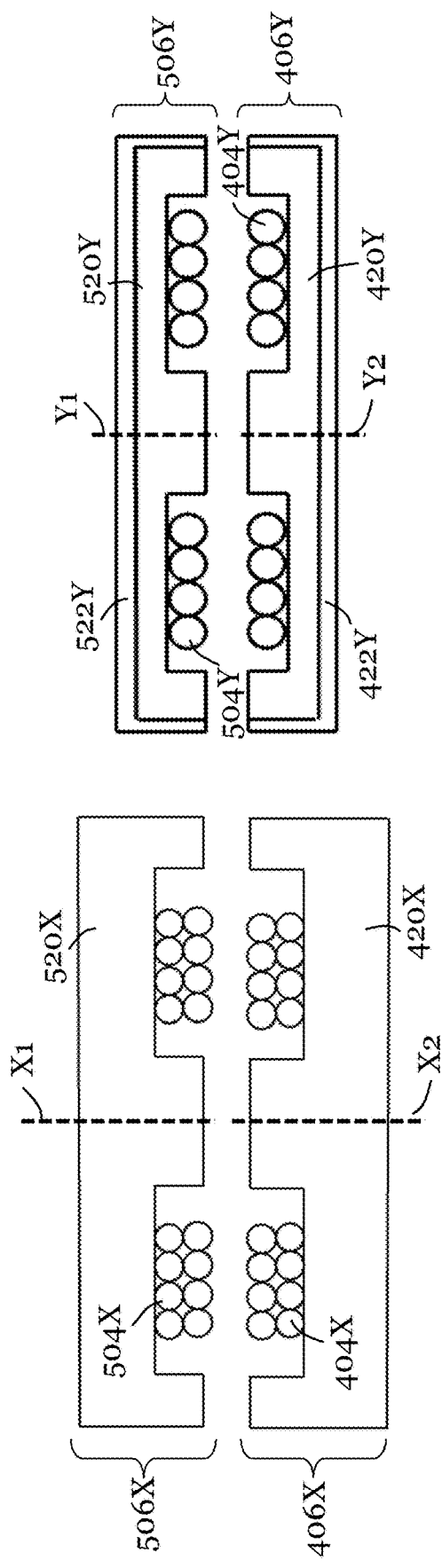

SYSTEM AND METHOD FOR CHARGING ELECTRIC VEHICLES

TECHNICAL FIELD

The present invention relates to a method of charging electric vehicles and a related charging system, and particularly, although not exclusively, to charging of electric vehicles from above the top of the electric vehicles.

BACKGROUND

Electric vehicles (EV), including hybrid electric vehicles (HEV), have become increasing popular around the world in recent years. Compared to conventional non-electric vehicles, electric vehicles consume less fuel or even do not use fuel (e.g., gasoline). They are also relatively environmental-friendly.

Generally, electric vehicles can be charged using wired charging systems. In common wired charging systems, a direct-contact plug of the charger or charging station, coupled with a power supply through a charging cable, is plugged into a socket in the vehicle to perform charging. These systems are effective to perform charging in mild environments. However, in harsh environments such as wet and dusty conditions, the plug is susceptible to corrosion. Also, in extreme cold weather, the electric charging cable may become frozen which in turn will render the charging system unusable. These problems have led to the development of alternative charging systems, in particular wireless charging systems.

SUMMARY OF THE INVENTION

In accordance with a first aspect of the present invention, there is provided a charger for an electric vehicle, comprising: a charging circuit operable to connect with a power supply, the charging circuit including a transmitter coil arranged for wirelessly transferring power to a receiver coil of an electric vehicle to charge the electric vehicle; and a movement mechanism arranged to enable movement of the transmitter coil for aligning the transmitter coil with a receiver coil arranged at a upper end of a chassis of an electric vehicle. The charger can also be considered as a charging station. Additionally or alternatively, the transmitter coil may be arranged for wirelessly communicating data with the electric vehicle through the receiver coil.

The power supply is preferably a power grid, but can also be an AC mains source or a DC power source. The DC power source may be one that is rectified from an AC mains source. The DC power source is preferably a renewable energy source. In one example, the DC power source may be one or more photovoltaic panels with associated circuits. The electric vehicle is a vehicle that operates at least partly based on electricity. In one example, the electric vehicle may be a pure electric vehicle or a hybrid electric vehicle. The vehicle may be grounded vehicles (such as cars, buses, trucks, and trains), airborne vehicles (aircraft), seaborne vehicles (e.g., ships, sailboats), etc. The vehicle may even be domestic or industrial robots. For example, the vehicles may be a robotic vacuum or a robotic mower.

In one embodiment of the first aspect, the transmitter coil is arranged in a transmitter pad. The transmitter coil may be circular, squared, spiral, and it may include one or more layers. In the examples with multiple transmitter coils, the transmitter coils may be arranged in parallel, orthogonal, or in other orientations with respect to each other. The transmitter pad can take any form, and is preferably planar. In one example, it may be in the form of a sphere, a cylinder, a circular disc, a cuboid, a cube, cylindrical with oval cross-section, etc. Preferably, the transmitter pad includes a water-proof layer and an electric shield. The water-proof layer is arranged to provide water insulation function; the electric shield is arranged to provide electrical insulation function. The transmitter pad may include a plastic housing.

In one embodiment of the first aspect, the transmitter pad comprises an electromagnetic shield for shielding magnetic field generated at the transmitter coil during charging. The transmitter pad may also shield magnetic field generated at the receiver coil during charging. In the normal orientation of the pad, the electrometric shield is positioned above the transmitter coil.

In one embodiment of the first aspect, the electromagnetic shield is at least partly formed by a magnetic core.

In one embodiment of the first aspect, the electromagnetic shield is at least partly formed by a ferromagnetic layer and a conducting layer made of conducting material; the ferromagnetic layer being arranged between the conducting layer and the transmitter.

In one embodiment of the first aspect, the electromagnetic shield includes a first portion that, during charging operation, is arranged above the transmitter coil relative to a ground (e.g., a physical ground or floor surface). Optionally, the electromagnetic shield further includes a second portion extending substantially perpendicular to the first portion, the first and second portions together defining a space that at least partly houses the transmitter coil. In one example, the first and second portion may define a substantially U-shape (e.g., inverted U-shape during charging operation).

In one embodiment in which the electromagnetic shield includes both the first and second portions, a length of the first portion may be substantially the same or slightly larger than that of the length defined by the plane of the transmitter coil. Alternatively, in one embodiment in which the electromagnetic shield includes only the first portion, the length of the first portion may be at least 1.5 times the length defined by the plane of the transmitter coil.

In one embodiment of the first aspect, the transmitter pad is arranged to engage with or be received in a dock or docking portion at the upper end of the chassis. In one example the dock or docking portion may include a recess and the transmitter pad may be arranged at least partly inside the recess. The transmitter pad may be completely received in the recess. In another example, the dock or docking station may include a protrusion and the transmitter pad may be formed with a complementary recess for receiving at least part of the protrusion. The protrusion may be completely received in the complementary recess of the transmitter pad.

In one embodiment of the first aspect, the charger further includes (i.e., is connected with) the power supply.

In one embodiment of the first aspect, the movement mechanism comprises a mechanical arm, the transmitter coil or the transmitter pad being arranged at one end of the mechanical arm. The movement mechanism may include one or more mechanical arms operably connected with one another. Electrical arrangements such as electric wires may run through or around the arm.

In one embodiment of the first aspect, the mechanical arm has at least two degrees of freedom. Preferably, the mechanical arm has at least two pivots or a universal joint.

In one embodiment of the first aspect, the mechanical arm comprises a flexible portion. In one example, the flexible portion may include a spring.

In one embodiment of the first aspect, the mechanical arm is movable both along a horizontal direction and along a vertical direction, sequentially or simultaneously. In some other embodiments, the mechanical arm may be moved only along the horizontal direction or only along the vertical direction. Preferably, the mechanical arm is movable in a 2-dimensional space or a 3-dimensional space.

In one embodiment of the first aspect, the mechanical arm is connected with a mechanical frame that is supported on a ground (e.g., a physical ground or floor surface); connected with a wall mount; or suspended from a ceiling. The mechanical frame may be fixed relative to the ground or may be movable along the ground. The wall mount may be fixed relative to the wall or may be movable along a guide rail on the wall.

In one embodiment of the first aspect, the charger further includes an alignment mechanism arranged to facilitate alignment of the transmitter coil with the receiver coil. The alignment mechanism may be one or more of: a magnetic member; and a sensor operable to identify a marker arranged on the chassis and to provide feedback to a controller arranged to control movement of the movement mechanism. Example of the sensor includes an optical sensor, an RF sensor, an infrared sensor, etc., arranged to identify or detect a corresponding marker on the chassis.

In one embodiment of the first aspect, the alignment mechanism is arranged to align the transmitter coil with the receiver coil such that one or more of the following conditions are satisfied: a spacing between the transmitter coil and the receiver coil is less than 100 mm; a central axis defined by the transmitter coil is substantially parallel to a central axis defined by the receiver coil; and a central axis defined by the transmitter coil coincide with a central axis defined by the receiver coil. Preferably, the spacing is smaller than 50 mm. The above conditions are each arranged to maximize the power transfer efficiency.

In one embodiment of the first aspect, the charger further comprises a controller arranged to control movement of the movement mechanism.

In one embodiment of the first aspect, the controller is arranged to receive manual user input for controlling movement of the arm. In one example, the controller may be connected with a joystick or a computer operable to receive commands from a user.

In one embodiment of the first aspect, the controller is arranged to automatically align of the transmitter coil with the receiver coil based on feedback from an alignment mechanism arranged to facilitate alignment of the transmitter coil with the receiver coil.

In one embodiment of the first aspect, the charger further includes a charging meter, operably connected with the charging circuit, for determining at least one of: an amount of power transferred from the charger through the transmitter coil; and a duration of a power transfer event. In one example, the charger only provides power when a deposit of account is made by the user, e.g., at the charging meter. In one example, the charging meter may be integrated with a parking meter.

In one embodiment of the first aspect, the charger further includes an indicator arranged to indicate an operation status of the transmitter coil.

In one embodiment of the first aspect, the transmitter coil is further arranged for wirelessly receiving power from the receiver coil of the electric vehicle, allowing power to be provided to the power supply to which the charger is operably connected. In other words, a reciprocal power (or even data) transfer may be enabled between the electric vehicle and the charger. To charge the rechargeable power source in the vehicle, power is transferred from the transmitter coil to the receiver coil. To provide power to a power supply (e.g., to a power grid, especially a power grid with limited power reserve), power of the electric vehicle (e.g., power in the rechargeable power source) may be transferred from the electric vehicle back to the charger, through the transmitter and receiver coils.

In accordance with a second aspect of the present invention, there is provided an electric vehicle, comprising: a chassis; a movement means coupled with the chassis for enabling movement of the electric vehicle; a drive mechanism operably connected with the movement means for driving the movement mechanism; a rechargeable power source operably connected with the drive mechanism for power operation of the drive mechanism; and a charging circuit operably connected with the rechargeable power source for charging the rechargeable power source, the charging circuit comprises a receiver coil arranged at an upper end of the chassis, the receiver coil being arranged to receiver power wirelessly from a transmitter coil of a charger. The movement mechanism may be wheels. The drive mechanisms may be motor. The rechargeable power source may be Lithium based batteries, fuel cells, etc. The charger may be considered as a charging station.

In one embodiment of the second aspect, the receiver coil is arranged in a receiver pad. The receiver coil may be circular, squared, spiral, and it may include one or more layers. In examples with multiple receiver coils, the receiver coils may be arranged in parallel, orthogonal, or in other orientations with respect to each other. The receiver pad can take any form, and is preferably planar. In one example, it may be in the form of a sphere, a cylinder, a circular disc, a cuboid, a cube, etc. Preferably, the receiver pad includes a water-proof layer and an electric shield. The water-proof layer is arranged to provide water insulation function; the electric shield is arranged to provide electrical insulation function. The receiver pad may include a plastic housing.

In one embodiment of the second aspect, the receiver pad comprises an electromagnetic shield for shielding magnetic field generated at the receiver coil during charging. The receiver pad may also shield magnetic field generated at the transmitter coil during charging. In the normal orientation of the pad, the electrometric shield is positioned below the receiver coil.

In one embodiment of the second aspect, the electromagnetic shield is at least partly formed by a magnetic core.

In one embodiment of the second aspect, the electromagnetic shield is at least partly formed by a ferromagnetic layer and a conducting layer made of conducting material; the ferromagnetic layer being arranged between the conducting layer and the receiver coil.

In one embodiment of the second aspect, the electromagnetic shield includes a first portion that, during charging operation, is arranged below the receiver coil relative to a ground (e.g., a physical ground or floor surface). Optionally, the electromagnetic shield further includes a second portion extending substantially perpendicular to the first portion, the first and second portions together defining a space that at least partly houses the receiver coil. In one example, the first and second portion may define a substantially U-shape (e.g., during charging operation).

In one embodiment in which the electromagnetic shield includes both the first and second portions, a length of the first portion may be substantially the same or slightly larger than that of the length defined by the plane of the receiver coil. Alternatively, in one embodiment in which the electromagnetic shield includes only the first portion, the length of the first portion may be at least 1.5 times the length defined by the plane of the receiver coil.

In one embodiment of the second aspect, the electric vehicle further includes a dock or docking portion arranged at the upper end of the chassis for receiving or engaging with a transmitter pad of the charger; the receiver pad being arranged at or adjacent the dock or docking portion; the transmitter pad containing the transmitter coil.

In one embodiment of the second aspect, the dock or docking portion comprises a recess on the upper end of the chassis. The transmitter pad may be at least partly be received in the recess. The transmitter pad may be completely received in the recess.

In one embodiment of the second aspect, the dock or docking portion comprises a protrusion from the upper end of the chassis. The protrusion may at least partly be received in a complementary recess formed on the transmitter pad. The protrusion may be completely received in the complementary recess formed on the transmitter pad.

In one embodiment of the second aspect, the electric vehicle further includes an alignment member arranged to facilitate alignment of the transmitter coil with the receiver coil.

In one embodiment of the second aspect, the alignment member comprises a magnetic member or a marker. The marker may be read by a sensor arranged at the charger to facilitate alignment of the coils.

In one embodiment of the second aspect, the upper end of the chassis is a roof of the chassis. In other embodiments, the upper end of the chassis may be the hood or the trunk or even the windshield of the vehicle.

In one embodiment of the second aspect, the electric vehicle further includes an indicator arranged to indicate an operation status of the receiver coil.

In one embodiment of the second aspect, the receiver coil is further arranged to transmit power wirelessly to the transmitter coil of the charger. In other words, a reciprocal power transfer is enabled between the charger and the electric vehicle. To charge the rechargeable power source in the vehicle, power is transferred from the transmitter coil to the receiver coil. To provide power to a power supply (e.g., to a power grid, especially a power grid with limited power reserve), power of the electric vehicle (e.g., power in the rechargeable power source) may be transferred from the electric vehicle back to the charger, through the transmitter and receiver coils.

In the second aspect, the electric vehicle is a vehicle that operates at least partly based on electricity. In one example, the electric vehicle may be a pure electric vehicle or a hybrid electric vehicle. The vehicle may be grounded vehicles (such as cars, buses, trucks, and trains), airborne vehicles (aircraft), seaborne vehicles (e.g., ships, sailboats), etc. The vehicle may even be domestic or industrial robots. For example, the vehicles may be a robotic vacuum or a robotic mower.

In accordance with a third aspect of the present invention, there is provided a method for manufacturing an electric vehicle, comprising: providing a chassis of the electric vehicle; providing a charging circuit for charging the electric vehicle; and arranging a receiver coil of the charging circuit at an upper end of the chassis, the receiver coil being arranged to receiver power wirelessly from a transmitter coil of a charger for charging a rechargeable power source of the electric vehicle.

In one embodiment of the third aspect, the receiver coil is arranged in a receiver pad.

In one embodiment of the third aspect, the method further includes assembling, in the chassis, a rechargeable power source for connection with the drive mechanism to power operation of the drive mechanism; and operably connecting the rechargeable power source with the charging circuit. The rechargeable power source may be Lithium based batteries, fuel cells, etc.

In one embodiment of the third aspect, the method further includes arranging a dock or docking portion at the upper end of the chassis for receiving or engaging with a transmitter pad of the charger; the receiver pad being arranged at or adjacent the dock or docking portion; the transmitter pad containing the transmitter coil.

In one embodiment of the third aspect, the dock or docking portion comprises a recess on the upper end of the chassis.

In one embodiment of the third aspect, the dock or docking portion comprises a protrusion protruding from the upper end of the chassis.

In one embodiment of the third aspect, the receiver coil is further arranged to transmit power wirelessly to the transmitter coil of the charger to provide power to the power supply to which the charger is operably connected.

In one embodiment of the third aspect, the method further includes arranging an alignment member in the electric vehicle to facilitate alignment of the transmitter coil with the receiver coil.

In one embodiment of the third aspect, the upper end of the chassis is a roof of the chassis. In other embodiments, the upper end of the chassis may be the hood or the trunk or even the windshield of the vehicle.

In one embodiment of the third aspect, the electric vehicle is the electric vehicle in accordance with the second aspect.

In accordance with a fourth aspect of the present invention, there is provided a method for charging an electric vehicle, comprising: moving at least one of a transmitter coil of a charger and a receiver coil arranged at an upper end of a chassis of an electric vehicle relative to the other; and aligning the transmitter coil with the receiver coil such that the transmitter coil is arranged above and proximal to the receiver coil.

In one embodiment of the fourth aspect, the moving step comprises moving the transmitter coil of the charger while the receiver coil of the electric vehicle remains substantially stationary.

In one embodiment of the fourth aspect, the moving step comprises moving the transmitter coil both along a horizontal direction and along a vertical direction, sequentially or simultaneously. In some other embodiments, the mechanical arm may be moved only along the horizontal direction or only along the vertical direction. Preferably, the moving step comprises moving the transmitter coil in a 2-dimensional space or a 3-dimensional space.

In one embodiment of the fourth aspect, at least one of the movement and alignment steps are performed manually.

In one embodiment of the fourth aspect, at least one of the movement and alignment steps are performed electronically, and preferably automatically.

In one embodiment of the fourth aspect, the alignment step comprises one or more of: aligning the transmitter coil with the receiver coil such that a spacing between the transmitter coil and the receiver coil is less than 100 mm; aligning the transmitter coil with the receiver coil such that a central axis defined by the transmitter coil is substantially parallel to a central axis defined by the receiver coil; and aligning the transmitter coil with the receiver coil such that a central axis defined by the transmitter coil coincide with a central axis defined by the receiver coil. Preferably, the spacing is smaller than 50 mm. The above conditions are each arranged to maximize the power transfer efficiency.

In one embodiment of the fourth aspect, the alignment step comprises docking the transmitter coil at a dock or docking portion arranged at the upper end of the chassis.

In one embodiment of the fourth aspect, the method further includes locking the transmitter coil in position upon aligning the transmitter coil with the receiver coil. This may be done by a mechanical or magnetic locking means arranged on the transmitter pad and/or on the receiver pad or associated chassis portion.

In one embodiment of the fourth aspect, the method further includes the step of transferring power from the charger to the electric vehicle, wirelessly through the transmitter coil and the receiver coil, for charging a rechargeable power source arranged in the electric vehicle. In one example, the power is only transferred when a deposit of account is made by the user, e.g., at the charging meter. Additionally or alternatively, the method includes the step of communicating data between the charger and the electric vehicle, wirelessly through the transmitter and receiver coils.

In one embodiment of the fourth aspect, the method further includes monitoring at least one of: an amount of power transferred from the charger through the transmitter coil; and a duration of a power transfer event.

In one embodiment of the fourth aspect, the method further includes transferring power from the electric vehicle to the charger, wirelessly through the transmitter coil and the receiver coil, for providing power to the power supply to which the charger is operably connected.

In one embodiment of the fourth aspect, the method further includes the step of indicating an operation status of at least one of the transmitter coil and the receiver coil.

In one embodiment of the fourth aspect, the method further includes identifying the vehicle, and associating the charging event with the identified vehicle.

In one embodiment of the fourth aspect, the electric vehicle is the electric vehicle in accordance with the second aspect of the present invention.

In one embodiment of the fourth aspect, the electric vehicle is the electric vehicle manufactured using the method in accordance with the third aspect of the present invention.

In one embodiment of the fourth aspect, the charger is the charger in accordance with the first aspect of the present invention.

In accordance with an fifth aspect of the present invention, there is provided a system for charging an electric vehicle, the system including means for moving at least one of a transmitter coil of a charger and a receiver coil arranged at an upper end of a chassis of an electric vehicle relative to the other; and means for aligning the transmitter coil with the receiver coil such that the transmitter coil is arranged above and proximal to the receiver coil.

BRIEF DESCRIPTION OF THE DRAWINGS

Embodiments of the present invention will now be described, by way of example, with reference to the accompanying drawings in which:

FIG. 4 is a functional block diagram of a charging system operable to be arranged in the electric vehicle of FIG. 3 in one embodiment of the present invention;

FIG. 5 is a functional block diagram showing a charging system in a charger (charging station) in one embodiment of the present invention;

FIG. 6A is a schematic view showing the alignment of the transmitter pad of the charger and the receiver coil of the electric vehicle in another embodiment of the present invention;

FIG. 6B is a schematic view showing the alignment of the transmitter pad of the charger and the receiver coil of the electric vehicle in another embodiment of the present invention;

FIG. 6C is a schematic view showing the alignment of the transmitter pad of the charger and the receiver coil of the electric vehicle in another embodiment of the present invention;

FIG. 7A is a schematic sectional diagram showing the basic structure of the transmitter pad of the charger and the receiver pad of the electric vehicle in one embodiment of the present invention;

FIG. 7B is a schematic sectional diagram showing the basic structure of the transmitter pad of the charger and the receiver pad of the electric vehicle in another embodiment of the present invention;

DETAILED DESCRIPTION OF THE PREFERRED EMBODIMENT

Figure 1:
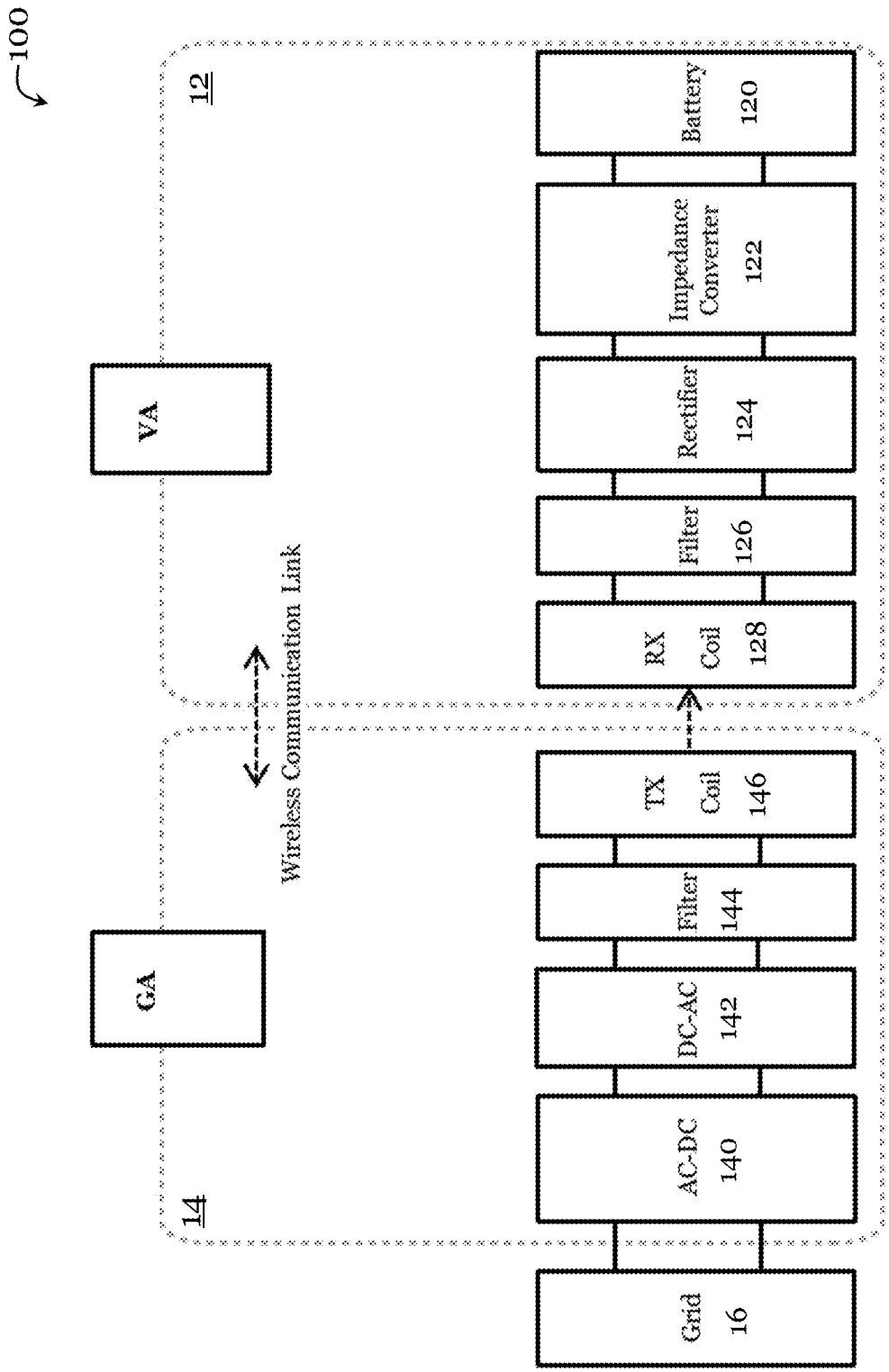
FIG. 1 is a block diagram showing a conventional wireless power transfer environment for an electric vehicle.

FIG. 1 shows a functional block diagram (i.e., does not represent circuit connection) of a conventional wireless power transfer environment 100 for an electric vehicle. As shown in FIG. 1, an electric vehicle 12 is operably connected to a charger (charging station) 14 for charging. The electric vehicle 12 includes a charging circuit operably connected with a rechargeable battery 120. The charging circuit of the electric vehicle 12 includes, in general, an impedance converter 122, a rectifier 124, a filter 126, and receiver coil 128 operably connected with one another. The charger 14 includes a charging circuit coupled with a power supply 16, e.g., a power grid network. The charging circuit of the charger 14 includes an AC-DC converter 140, a DC-AC rectifier 142, a filter 144, and a transmitter coil 146. In the environment 100, the transmitter coil 146 of the charger 14 is arranged to wirelessly transfer power to the receiver coil 128 of the vehicle 12 to charge the battery 120 in the vehicle 12. In some cases, a wireless communication link may be formed between the vehicle 12 and the charger 14, through other communication interfaces. One example of a detailed circuit can be found in the SAE TIR J2954 Industrial Guidelines for Wireless Charging of Plug-In Electric Vehicles in May 2016 launched by The Society of Automotive Engineers (SAE).

Figure 2:
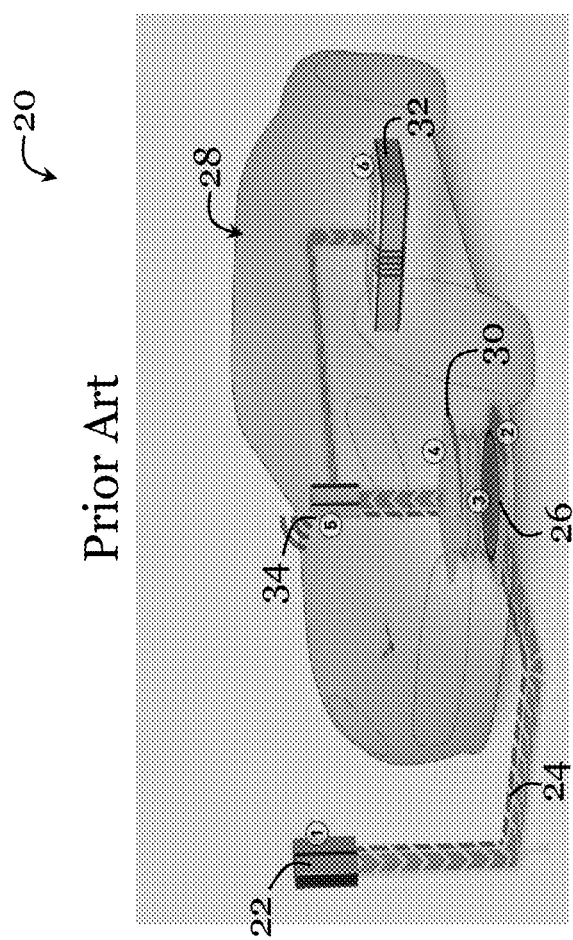
FIG. 2 is a schematic diagram showing a conventional method for transferring power and/or data to an electric vehicle.

FIG. 2 shows how conventional wireless charging systems are arranged to operate such as in the environment of FIG. 1. For simplicity only relevant structures are shown in the Figure. As shown in FIG. 2, the system 20 includes a charger with a power supply 22 connected through a wire 24 to a transmitter coil 26 fixedly placed on or embedded in the floor below the vehicle 28. The vehicle 28 includes a receiver coil 30 installed in the bottom of the vehicle chassis, a power source 32, and a controller 34 operably connecting the receiver coil 30 with the power source 32. To charge the vehicle 28, the user drives the vehicle 28 to a suitable position, manually, e.g., guided by markers on the ground, to align the transmitter and receiver coils 26, 30 for charging.

The inventor of the present invention has devised that, to date, there is a strong technical prejudice in the technical field to employ the charging system of FIG. 2 in wireless charging of electric vehicles. This is at least partly because these systems have become an international standard.

The inventor of the present invention has devised, through research, experiments, and trials, that the energy efficiency ($\eta$) of a wireless power transfer (charging) system based on magnetic induction or magnetic resonance is proportional to the product of the magnetic coupling coefficient and the quality factors for the transmitter and receiver coils $$\eta \propto k\sqrt{Q_1 Q_2} \tag{1}$$

where k is the magnetic coupling coefficient; Q1 and Q2 are the quality factors of the two coils used for as the transmitter coil and receiver coil respectively. The coupling coefficient k is inversely proportional to the transmission distance d:

$$k \propto \frac{1}{d^x} \tag{2}$$

where $x \geq 1$ typically. Equations (1) and (2) indicate that the energy efficiency of a wireless power transfer system decreases with increasing transmission distance.

The inventor of the present invention has devised, through research, experiments, and trials, that existing wireless charging systems, such as the one shown in FIG. 2, whilst popular, are deficient in a number of ways.

Firstly, the prejudice to arrange the receiver coil 30 to be embedded in the bottom of the vehicle chassis and the prejudice to arrange the transmitter coil 26 on the ground below the vehicle 28 have resulted in a wireless charging arrangement that leaves a considerably large gap between the transmitter and receiver coils 26, 30. In the SAE 2016 guidelines, the size of the gap (i.e. transmission distance) varies from 100 mm for Class Z1 to up to 250 mm for Class Z3. Since the wireless power transfer energy efficiency is inversely proportional to the transmission distance, a considerably large transmission distance will lead to relatively low energy efficiency.

Secondly, with a large transmission distance up to 250 mm, the transmitter and receiver coils 26, 30 are more susceptible to misalignment. Again, this leads to poor wireless power transfer energy efficiency.

Thirdly, the relatively large transmission distance causes magnetic flux leakage in the surrounding between the transmitter and receiver coils 26, 30. In some examples, foreign objects, humans or animals, on the ground nearby or beneath the vehicle 28 may be exposed to a strong magnetic field, resulting in potential health problems or hazards.

The inventor of the present invention has devised that, for the above reasons, existing wireless power transfer systems such as those which follow the SAE 2016 guidelines typically have energy efficiency of less than 92% even when the transmitter and receiver coils 26, 30 are aligned perfectly.

Figure 3:
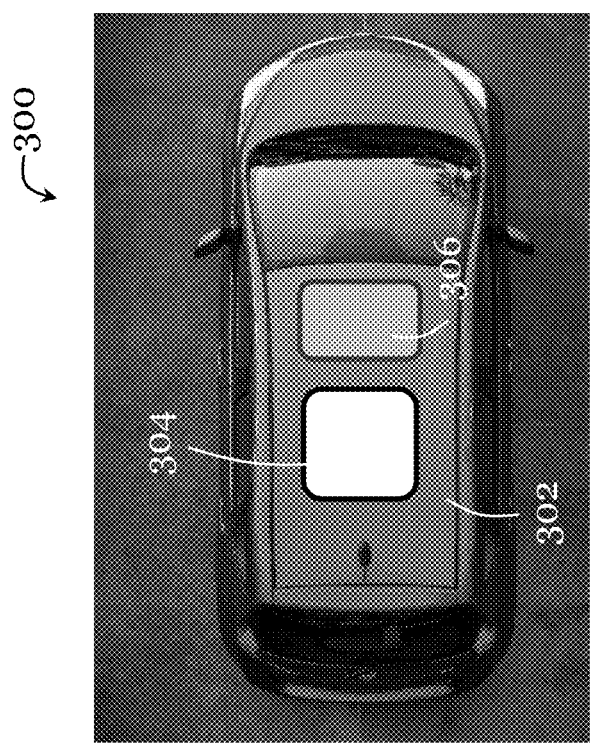
FIG. 3 is a schematic diagram showing a top view of an electric vehicle in one embodiment of the present invention.

FIG. 3 shows the top view of an electric vehicle 300, in the form of an electric car, in accordance with one embodiment of the present invention. The vehicle 300 shown in FIG. 3 includes a chassis with a roof 302. A receiver coil 304, arranged in a receiver pad in this embodiment, is mounted on the roof 302. In some embodiments, the receiver coil 304 may be on the surface of the roof 302, or immediately below the surface of the roof 302. In some other embodiments, depending on the structure of the vehicle and its chassis, the receiver coil may be arranged an upper end of the chassis (relative to the ground on which the chassis is supported), such as the hood, the trunk, or the windshield of the vehicle. In one embodiment, the upper end is preferably substantially horizontal. The upper end may be flat or uneven. FIG. 3 also shows a sunroof window 306 on the roof 302, but this window is not essential to the invention. In the present embodiment, the receiver pad in which the receiver coil 304 is arranged includes a water-proof layer for water insulation and an electric shield for electrical insulation. The water-proof layer and electric shield preferably enclose the receiver coil 304 for improved water- and electrical-insulation performance.

The electric vehicle 300 in the embodiment of FIG. 3 also includes some general features not shown. It generally includes a movement means, e.g., wheels, for enabling movement of the electric vehicle on the ground. It also includes a drive mechanism, e.g., motor, for driving the wheels. A rechargeable battery is provided for powering operation of the motor. A charging circuit is operably connected with the rechargeable battery for controlling charging of the rechargeable battery. In the present embodiment, the receiver coil 304 arranged at the roof 302 of the chassis is part of the charging circuit. The receiver coil 304 is arranged to receive power wirelessly from a transmitter coil of a charger. In some embodiments, the receiver coil 304 may be arranged also to transmit power wirelessly to the transmitter coil of the charger, and, e.g., to a power supply operably connected with the charger. Additionally, the receiver coil 304 may be arranged to receive data wirelessly from the transmitter coil of the charger. In one example, the receiver coil 304 is further arranged to transmit data wirelessly to the transmitter coil of the charger.

FIG. 4 shows a functional block diagram of a charging system 400 operable to be arranged in the electric vehicle 300 of FIG. 3 in one embodiment of the present invention. Other components of the vehicle not directly related to the charging system 400 are omitted for clarity.

As shown in FIG. 4, the system 400 has a charging circuit 402 (also called receiver circuit) including the receiver coil 404 arranged in the receiver pad 406. The charging circuit 402 is operably connected with a controller 408 and a rechargeable power source 410. The receiver coil 404 may be arranged in any form, e.g., circular, squared, spiral. It may form one or multiple layers. In the examples with multiple receiver coils, the receiver coils may be arranged in parallel, orthogonal, or in other orientations with respect to each other. The receiver pad 406 may be arranged in any form, e.g., spherical, cylindrical, cuboidal, cubical, disc-shaped. In a preferred embodiment, the receiver pad 406 includes a plastic housing. The receiver pad 406 may include a water-proof layer and an electric shield for protecting and improving the operational effectiveness of the receiver coil 404. In particular, the water-proof layer may be arranged to provide water insulation function, and the electric shield may be arranged to provide electrical insulation function. In a preferred embodiment, the receiver pad 406 includes an electromagnetic shield (different from the above-described electric shield) for shielding magnetic field generated at the receiver coil 404 during charging. In some cases, the electromagnetic shield may also shielding magnetic field generated at a transmitter coil arranged proximal to the receiver coil 404 during charging. In a normal orientation with the vehicle supported on a ground (e.g., a physical ground or floor surface), the electrometric shield is positioned below the receiver coil 404. Through this arrangement, the side of the receiver pad 406 facing the interior (i.e., the passenger area) of the vehicle will have an electromagnetic shield such that that the magnetic flux generated by the transmitter pad and the receiver pad 406 will not penetrate into the passenger area. In the present invention, the receiver coil 404 or receiver pad 406 may be arranged at a docking portion arranged at the roof of the vehicle chassis.

The charging circuit 402 in the vehicle of the present embodiment includes other circuit components operably connected with the receiver coil. These components (not shown) may include an LC tank, a filter, a rectifier, an impedance converter, etc. In a preferred embodiment, these components may include an impedance filter (e.g. a resonant capacitor which forms a resonant tank with the receiver coil 404) and an AC-DC power converter (such as a rectifier circuit which turns the ac voltage into a dc voltage). During charging, the DC voltage output of the AC-DC power circuit provides the DC voltage source for charging the rechargeable power source 410 (e.g., battery, Li based or other chemistry) of the vehicle. In one example, this is performed through the controller 408 which acts as battery management system in the vehicle.

The system in FIG. 4 also includes an alignment member 412 to facilitate alignment of a transmitter coil of a charger with the receiver coil 404. The alignment member 412 may be provided in or on the housing of the receiver pad. In one embodiment, the alignment member 412 may be a magnet or magnetic member arranged to engage with a complementary metallic or magnetic part of a transmitter pad in which the transmitter coil is arranged. Preferably, the magnets are positioned to facilitate proper alignment of the transmitter coil and the receiver coil 404 for maximizing power transfer during charging. Such magnet arrangement may also assist in locking the transmitter pad to the receiver pad 406, providing a firm engagement between the two pads. In another embodiment, the alignment member 412 may be a marker, e.g., a fiducial marker, a symbol, or colour mark, arranged on the upper surface of the chassis. The markers are preferably arranged in a position of the chassis that corresponds to the receiver coil 404. These markers may be detected by a sensor in the form of a camera or other optical or electromagnetic means provided on the charger. In some examples, the markers may be any marker or components that can be detected by optical, radio-frequency, or infra-red detector on the charger.

In the present embodiment, the controller 408 of the charging system 400 in the electric vehicle may include processing unit and a memory unit. In one example, the processing unit is a processor such as a CPU, an MCU, etc. The memory unit may include a volatile memory unit (such as RAM), a non-volatile unit (such as ROM, EPROM, EEPROM and flash memory) or both. The controller 408 may be connected to one or more input devices such as a keyboard, a mouse, a stylus, a microphone, a tactile input device (e.g., touch sensitive screen) and a video input device (e.g., camera), for receiving input. The controller 408 may further be connected with one or more output devices such as one or more displays, speakers, etc. The controller 408 is also preferably connected with a communication module for establishing one or more communication links (not shown) with one or more other computing devices such as a server, personal computers, terminals, wireless or handheld computing devices at the charging station or network of the vehicle owner. The communication module may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit, the memory unit, and optionally the input devices, the output devices, and the communication module are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the controller 408 in the present invention may have different configurations.

In one embodiment, the receiver coil 404 may be arranged also to transmit power wirelessly to the transmitter coil of the charger, and e.g., to a power supply operably connected with the charger. Additionally, the receiver coil 404 may be arranged to receive data wirelessly from the transmitter coil of the charger. In one example, the receiver coil 404 is further arranged to transmit data wirelessly to the transmitter coil of the charger.

In a preferred embodiment, the system 400 may further include one of more indicators for indicating an operation status of the receiver coil. The indicator may be operably connected with the controller 408 that is operable to detect an operation status of the receiver coil. The indicator may be a visual indicator, an audible indicator, a tactile indicator, or a combination thereof. In one example, the indicator is a light indicator formed by one or more LEDs, a display, or a fuel gauge, etc. In another example, the indicator is an audio indicator formed by a buzzer, a speaker, etc.

FIG. 5 shows a charging system 500 in a charger (charging station) in one embodiment of the present invention. Preferably, the charger is adapted to charge the electric vehicle of FIG. 3 or cooperate with the charging circuit in the vehicle of FIG. 4.

The charging system 500 in FIG. 5 includes a charging circuit 502 (also called transmitter circuit) including the transmitter coil 504 arranged in the transmitter pad 506. The charging circuit 502 is operably connected with a controller 508 and a power supply 510 (e.g., power grid supply). The transmitter coil 504 may be arranged in any form, e.g., circular, squared, spiral. It may form one or multiple layers. In the examples with multiple transmitter coils, the transmitter coils may be arranged in parallel, orthogonal, or in other orientations with respect to each other. The transmitter pad 506 may be arranged in any form, e.g., spherical, cylindrical, cuboidal, cubical, disc-shaped, cylindrical with oval cross-section, etc., and is preferably planar. In a preferred embodiment, the transmitter pad 506 includes a plastic housing. The transmitter pad 506 may include a water-proof layer and an electric shield for protecting and improving the operational effectiveness of the transmitter coil 504. In particular, the water-proof layer may be arranged to provide water insulation function, and the electric shield may be arranged to provide electrical insulation function. In a preferred embodiment, the transmitter pad 506 includes an electromagnetic shield (different from the above-described electric shield) for shielding magnetic field generated at a receiver coil of the vehicle during charging. In some cases, the electromagnetic shield may also shielding magnetic field generated at the receiver coil arranged proximal to the transmitter coil 504 during charging. In a normal orientation of the transmitter pad 506, the electrometric shield is positioned above the transmitter coil 504 relative to the ground. In the present invention, the transmitter coil 504 or transmitter pad 506 may be carried on a movement mechanism 514 such as a mechanical arm that can be controller manually or electronically (preferably automatically).

The charging circuit 502 in the present invention includes other circuit components (not shown) operably connected with the transmitter coil 504. These components may include a filter, a ADC or DAC rectifier, impedance converter, etc. The charging circuit 502 is operably connected with the power supply 510, e.g., power grid, for obtaining power from the power supply 510 for charging the vehicle. During charging, power is obtained from the power grid, rectified by the charging circuit 502, and then provided to the electric vehicle through the transmitter coil 504 and the receiver coil. Alternatively, the power supply 510 may be an AC mains source or a DC power source. For example, the DC power source may be one that is rectified from an AC mains source. The DC power source is preferably a renewable energy source (e.g., from photovoltaic panels).

The charging system 500 also includes a movement mechanism 514 that enables the transmitter pad 506 to be manipulated. Preferably, the movement mechanism 514 comprises a mechanical arm. The transmitter coil 504 or the transmitter pad 506 may be arranged at one end of the mechanical arm such that movement of the arm causes the transmitter coil 504 or pad 506 to be arranged on top of the vehicle. In some embodiments, the movement mechanism 514 may include one or more mechanical arms operably connected with one another. In one embodiment, the movement mechanism 514 is manually controlled so that it can be freely manipulated by the user. Additionally or alternatively, the movement mechanism may be electronically controlled such that it can move in response to a manual user input at a controller or to an automatic feedback system operably connected with the controller. In some examples, electrical arrangements such as electric wires and cables that are preferably flexible may run through or around the arm(s), enabling connection of the transmitter pad 506, the controller 508, and the power supply 510. Preferably, the mechanical arm has at least two degrees of freedom. In one example, the mechanical arm has at least two pivots or has a universal joint. In one example, the mechanical arm may include a flexible portion such as a spring. The mechanical arm may be telescopic, or may be extendible and retractable to suit vehicle chassis of different height. In the present embodiment, the mechanical arm is movable both along a horizontal direction and along a vertical direction, sequentially or simultaneously. However, in some other embodiments, the mechanical arm may be moved only along the horizontal direction or only along the vertical direction.

The mechanical arm may be connected with a mechanical frame that is supported on a ground (e.g., a physical ground or floor surface). The mechanical frame may be fixed relative to the ground or may be movable along the ground. Alternatively, it may be connected with a wall mount or suspended from a ceiling. The wall mount may be fixed relative to the wall or may be movable along a guide rail on the wall.

In embodiments in which the mechanical arm is automatically controlled, the controller 508 can use the alignment mechanism 512 as a guide to control movement of the arm to guide and position the transmitter pad 506 directly on top of receiver pad on the roof of the electric vehicle. In some examples, the wireless charging area of the roof of the electric vehicle is marked with marker in the form of a symbol or colour.

In embodiments in which the mechanical arm is manually controlled, the controller 508 may be operable to receive user input through input means such as keyboard, touch screen, joystick, etc. The controller 508 is operable to control movement of the arm based on the user input. In some cases, the wireless charging area of the roof of the electric vehicle is marked with marker in the form of a symbol or colour to facilitate the user to position the transmitter pad 506 on top of the receiver pad. In some cases, a dock or docking portion may be arranged on the roof of the chassis, and/or a magnetic alignment mechanism 512 may be provided to assist alignment of the coils/pads.

The alignment mechanism 512 in the charging system in FIG. 5 is arranged to facilitate alignment of the transmitter coil 506 with a receiver coil of the electric vehicle. In one embodiment, the alignment mechanism 512 may be a magnet or magnetic member arranged to engage with a complementary metallic or magnetic part of receiver pad in which the receiver coil is arranged. Preferably, the magnets are positioned to facilitate proper alignment of the transmitter coil 504 and the receiver coil for maximum power transfer during charging. Such magnet arrangement may also assist in locking the transmitter pad 506 with the receiver pad, providing a firm engagement between the two pads. In another embodiment, the alignment mechanism 512 may be formed by an optical, radio-frequency, or infra-red detector. The detector may be used to detect a marker e.g., a fiducial marker, a symbol, or colour mark, arranged on the upper surface of the chassis. The markers are preferably arranged in a position that corresponds to the receiver coil. In one embodiment, the alignment mechanism 512 has a camera for identifying a marker arranged on the chassis and for providing feedback to the controller 508 for automatically controlling movement of the mechanical arm to align the transmitter coil 504 with the receiver coil. Preferably, the alignment mechanism 512 is arranged to align the transmitter coil 504 with the receiver coil such that a spacing between the transmitter coil 504 and the receiver coil is less than 100 mm, more preferably less than 50 mm. It is also preferable that, alternatively or additionally, a central axis defined by the transmitter coil 504 is substantially parallel to or even coincide with a central axis defined by the receiver coil. These arrangements can effectively maximize the power transfer efficiency.

In some embodiments, the controller 508 of the charger is arranged to receive manual user input for controlling movement of the movement mechanism 514. In one example, the controller 508 may be connected with a joystick or a computer operable to receive commands from a user. Alternatively, the controller 508 may be arranged to control movement of the movement mechanism 512 to automatic align of the transmitter coil 504 with the receiver coil based on feedback from the alignment mechanism 512.

In the present embodiment, the controller 508 of the charging system in the charger may include processing unit and a memory unit. In one example, the processing unit is a processor such as a CPU, an MCU, etc. The memory unit may include a volatile memory unit (such as RAM), a non-volatile unit (such as ROM, EPROM, EEPROM and flash memory) or both. The controller 508 may be connected to one or more input devices such as a keyboard, a mouse, a stylus, a microphone, a tactile input device (e.g., touch sensitive screen) and a video input device (e.g., camera), for receiving input. The controller 508 may further be connected with one or more output devices such as one or more displays, speakers, etc. The controller 508 is also preferably connected with a communication module for establishing one or more communication links (not shown) with one or more other computing devices such as a server, personal computers, terminals, wireless or handheld computing devices at the electric vehicle or of a power grid network, a charging management facility or parking facility. The communication module may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit, the memory unit, and optionally the input devices, the output devices, and the communication module are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the controller 508 in the present invention may have different configurations.

In one embodiment, the transmitter coil 504 may be arranged also to receive power (e.g., of the rechargeable power source in the vehicle) wirelessly from the receiver coil of the vehicle, e.g., to power provide to a power supply operably connected with the charger. This may occur when the power of the power supply runs low. Additionally, the transmitter coil 504 may be arranged to receive data wirelessly from the receiver coil of the vehicle. In one example, the transmitter coil 504 is further arranged to receive data wirelessly from the receiver coil of the vehicle.

In a preferred embodiment, the system 500 may further include one of more indicators for indicating an operation status of the transmitter coil. The indicator may be operably connected with the controller 508 that is operable to detect an operation status of the transmitter coil. The indicator may be a visual indicator, an audible indicator, a tactile indicator, or a combination thereof. In one example, the indicator is a light indicator formed by one or more LEDs, a display, or a fuel gauge, etc. In another example, the indicator is an audio indicator formed by a buzzer, a speaker, etc.

In some embodiments, the charging system 500 of the charger also includes a charging meter 516. The meter 516 may be operably connected with the charging circuit 502 and hence the controller 508 for determining an amount of power transferred from the charger through the transmitter coil 504 or a duration of a power transfer event. In one example, the charger only provides power when a deposit of account is made by the user at the charger, e.g., through an interface of the charging meter 516. In one example, the charging meter 516 may be integrated with a parking meter.

FIGS. 6A-6C show how the transmitter pad 506A-506C of the charger and the receiver pad 406A-406C of the electric vehicle may be aligned in some embodiments of the present invention. For simplicity, the respective transmitter and receiver coils in the pads 406A-406C, 506A-506C, as well as other circuit details and connections are not shown in these Figures.

In the embodiment of FIG. 6A, the upper end (e.g., roof) of the chassis 600A of the vehicle is substantially planar. The receiver pad 406A with the receiver coil is arranged beneath the top surface of the chassis 600A. A transmitter coil, arranged in a transmitter pad 506A, may be manipulated and placed directly onto the chassis in a position corresponding to the receiver pad 406A. This may be performed manually or electronically (preferably automatically) by means of the alignment mechanism provided on the vehicle and the charger respectively. Optionally, a locking mechanism, e.g., magnetic or mechanical, (latch, lock, etc.) may be further provided to secure the transmitter pad 506 in place.

In the embodiment of FIG. 6B, a recess 602B is formed on the upper end (e.g., roof) of the chassis 600B of the vehicle. The receiver pad 406B with the receiver coil is arranged beneath the base wall of the recess 602B. In this example, the recess 602B is used as a dock or docking portion for receiving the transmitter pad 506B in which the transmitter coil is arranged. A transmitter coil, arranged in a transmitter pad 506B, may be manipulated and placed directly in the recess 602B, thus reliably aligning the transmitter pad 506B with the receiver pad 406B and also securing the transmitter pad 506B to the vehicle. The manipulation may be performed manually or electronically (preferably automatically) by means of the alignment mechanism provided on the vehicle and the charger respectively. As shown, the transmitter pad 506B is only partly received in the recess 602B. In some other examples, however, the recess 602B may be sufficiently deep to allow the transmitter pad 506B to be completely received in the recess 602B.

In the embodiment of FIG. 6C, a protrusion 602C is formed on the upper end (e.g., roof) of the chassis 600C of the vehicle. The receiver pad 406C with the receiver coil is arranged beneath the top wall of the protrusion 602C. In this example, the protrusion 602C is used as a dock or docking portion for engage with a transmitter pad 506C in which the transmitter coil is arranged. A transmitter coil, arranged in a transmitter pad 506C, may be manipulated and placed directly onto the protrusion 602C, at least partly enclosing it, thus readily aligning the transmitter pad 506C with the receiver pad 406C and also securing the transmitter pad 506C to the vehicle. The manipulation may be performed manually or electronically (preferably automatically) by means of the alignment mechanism provided on the vehicle and the charger respectively. The transmitter pad 506C in this example includes a complementary recess arranged to receive, at least partly, the protrusion 602C. In some other examples, provided that the recess on the transmitter pad 506C is sufficiently deep, the transmitter pad 506C may completely receive the protrusion 602C.

It should be appreciated that the recess 602B or the protrusion 602C in the above embodiments of the dock or docking portion may take any shape or form, depending on the construction of the transmitter pad and the vehicle. In one example, the recess need not have a flat, planar base wall. Likewise, the protrusion need not have a flat, planar top wall. In some embodiments, a combination of recesses and protrusions may be used as a dock. In yet some other embodiments, multiple recesses may be used as a dock, or multiple protrusions may be used as a dock. The transmitter and receiver pads need not be of the same size, shape or form.

In the present invention, the receiver pad 406A-406C is arranged at the roof of the vehicle, while the transmitter pad 506A-5006C is placed, manually or electronically, on top of the receiver pad 406A-406C. In order to minimize unwanted exposure of the magnetic field to foreign objects (humans, animals, etc.), in some embodiments, it is preferable to enclose the magnetic field between the transmitter pads 506A-506C and the receiver pads 406A-406C. Since wireless power transfer occurs between the bottom side of the transmitter pad 506A-506C and the top side of the receiver pad 406A-406C, it is desirable to prevent magnetic field from emitting through the top side of the transmitter pad 506A-506C and the bottom side of the receiver pad 406A-406C. In a preferred embodiment, the means for enclosing the magnetic field has a relative thin structure, particularly for the receiver pad 406A-406C that has to be installed in the roof of the vehicle chassis.

FIGS. 7A and 7B show the basic structures of the electromagnetic shields of the transmitter pad 506X, 506Y of the charger and the receiver pad 406X, 406Y of the electric vehicle in some embodiments of the present invention. In FIGS. 7A and 7B, the water-proof and electrical-insulation structures of the transmitter pad 506X, 506Y and the receiver pad 406X, 406Y are not shown for simplicity.

In FIG. 7A, the transmitter pad 506X includes a transmitter coil 504X and a magnetic core 520X that acts as an electromagnetic shield. In this example, the transmitter coil 504X has two layers, and the magnetic core 520X has a substantially E-shape (rotated clockwise by 90 degrees). The transmitter coil 504X defines a central axis X1. In FIG. 7A, the magnetic core 520X includes a first portion that extends substantially parallel to and above a plane defined by the transmitter coil 504X, and a second portion, extending from the first portion, substantially perpendicular to the plane defined by the transmitter coil 504X. The first and second portion together defines a space of at least partly housing the transmitter coil 504X. In this example, the first and second portions define a substantially U-shape. The receiver pad 406X includes a receiver coil 404X and a magnetic core 420X, the structure of which is similar to that of the transmitter pad 506X. The main difference between the two is that in the receiver pad 406X, the magnetic core 420X is arranged below the receiver coil 404X. Preferably, when aligned, the central axis X1 of the transmitter coil 504X is substantially parallel to the central axis X2 of the receiver coil 404X. More preferably, the central axis X1 of the transmitter coil 504X coincides with the central axis X2 of the receiver coil 404X.

FIG. 7B shows another electromagnetic shield arrangement. In FIG. 7B, the electromagnetic shield of the transmitter pad 506Y is formed by a ferromagnetic layer 520Y and a conducting layer 522Y made of conducting material. Preferably, the ferromagnetic layer 520Y is arranged between the conducting layer 522Y and the transmitter coil 504Y. In this example, the transmitter coil 504Y has only one layer, and the electromagnetic shield has a substantially E-shape (rotated clockwise by 90 degrees). The transmitter coil 504Y defines a central axis Y1. Like the embodiment of FIG. 7A, the electromagnetic shield in FIG. 7B includes a first portion that extends substantially parallel to and above a plane defined by the transmitter coil 504Y, and a second portion, extending from the first portion, substantially perpendicular to the plane defined by the transmitter coil 504Y. Both the first portion and the second portion include the ferromagnetic layer 520Y and the conducting layer 522Y. The first and second portion together defines a space of at least partly housing the transmitter coil 504Y. In this example, the first and second portions define a substantially U-shape. The receiver pad 406Y includes a receiver coil 404Y and a corresponding electromagnetic shield of like construction to that of the transmitter pad 506Y. The main difference between the two is that in the receiver pad 406Y, the electromagnetic shield is arranged below the receiver coil 404Y. Preferably, when aligned, the central axis Y1 of the transmitter coil 504Y is substantially parallel to the central axis Y2 of the receiver coil 404Y. More preferably, the central axis Y1 of the transmitter coil 504Y coincides with the central axis Y2 of the receiver coil 404Y.

It should be appreciated that the electromagnetic shield in the above embodiments may take any other shape or form, depending on the construction of the transmitter and receiver coils 404X, 404Y, 504X, 504Y, as well as other structure in the transmitter and receiver pads 406X, 406Y, 506X, 506Y. In some embodiments, the electromagnetic shields in FIGS. 7A and 7B may be formed only by the first portion. In these cases, the length of the first portion is at least 1.2, preferably at least 1.5 times the length defined by the plane of the transmitter coil 504X, 504Y. In one embodiment, the electromagnetic shields may be partly formed by a magnetic core, or partly formed by a ferromagnetic layer and a conducting layer. Also, the size, form, or shape of the transmitter and receiver coils need not be the same. Likewise the size, form, or shape of the transmitter and receiver pads need not be the same.

By arranging such electromagnetic shields, the transmission distance between the transmitter and received pads 406X, 406Y, 506X, 506Y can be kept as small as possible (typically a few millimetres to at most a few tens of millimetres) for achieving high energy efficiency and the ac magnetic field between the transmitter and received pads 406X, 406Y, 506X, 506Y can be sandwiched or enclosed by the electromagnetic shield for minimizing human exposure to the magnetic field and heating problem of nearby foreign objects.

FIGS. 8A to 8D show some embodiments of the charger (charging station) 800A-800D of the present invention. In the Figures, only the transmitter pad mounted at one end of the movement mechanism, the receiver pad of the vehicle, and the simplified structure of the flexible mechanical arm are presented. Details of the transmitter and receiver power equipment, battery management system and the batteries are all omitted for simplicity.

Figure 8A:
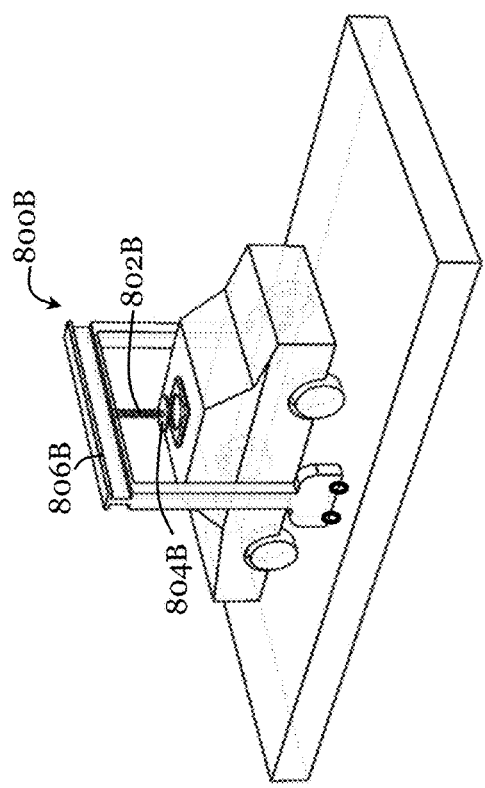
FIG. 8A is a schematic diagram illustrating a charger (charging station) in one embodiment of the present invention.

FIG. 8A shows a pole mounted arrangement 800A, which may be manually controlled or electronically controlled. In this example, one end of a substantially L-shaped mechanical arm 802A holds the transmitter pad 804A while the other end is connected onto a mechanical pole 806A. Preferably, the mechanical arm 802A is flexible or movable, and can be raised, lowered, and manipulated along a horizontal direction. In one example, the arm 802A has multiple portions connected by one or more rotatable joints. This arrangement 800A is particularly suitable for parked vehicles along parking spaces along the roads and also in indoor parking spaces. A charging meter 808A, optionally incorporated with a parking meter, may be provided in this example.

Figure 8B:
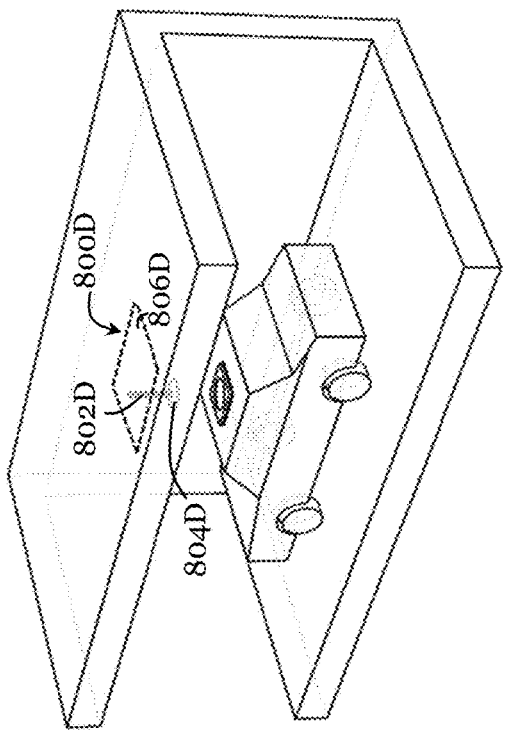
FIG. 8B is a schematic diagram illustrating a charger (charging station) in another embodiment of the present invention.

FIG. 8B shows a frame-mounted arrangement 800B, which may be manually controlled or electronically controlled. In this example, one end of the mechanical arm 802B holds the transmitter pad 804B while the other end is connected onto a mechanical frame 806B in the form of an are that rests on the ground. In one example the frame is fixed on the ground but in some other cases the frame is movable, e.g., by wheels and/or guide rails. This arrangement 800B is particularly suitable for both indoor and outdoor car parks.

Figure 8C:
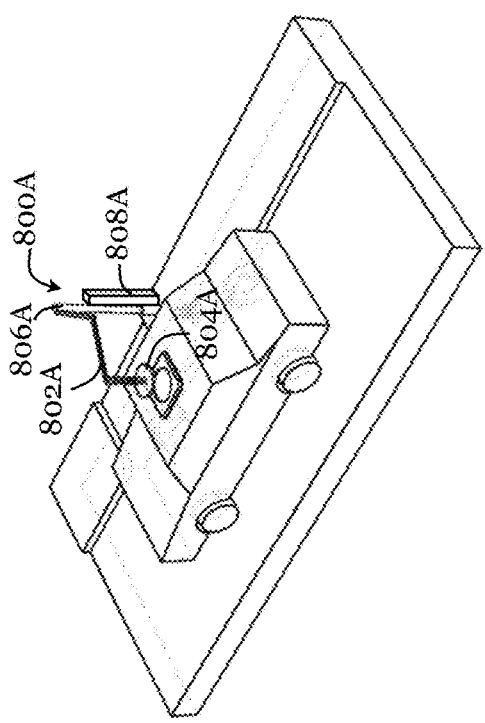
FIG. 8C is a schematic diagram illustrating a charger (charging station) in a further embodiment of the present invention.

FIG. 8C shows a wall-mounted arrangement 800C, which may be manually controlled or electronically controlled. In this example, one end of the first mechanical arm 802C holds the transmitter pad 804C while the other end is connected to another mechanical arm connected with the wall mount 806C. In one example, the wall mount 806C may be fixed on the wall. In other examples, the wall mount 806C may be movable along the wall surface, in one or two dimensions, through e.g. guide rails. This arrangement 800C is particularly suitable for indoor parking facilities, such as garages.

Figure 8D:
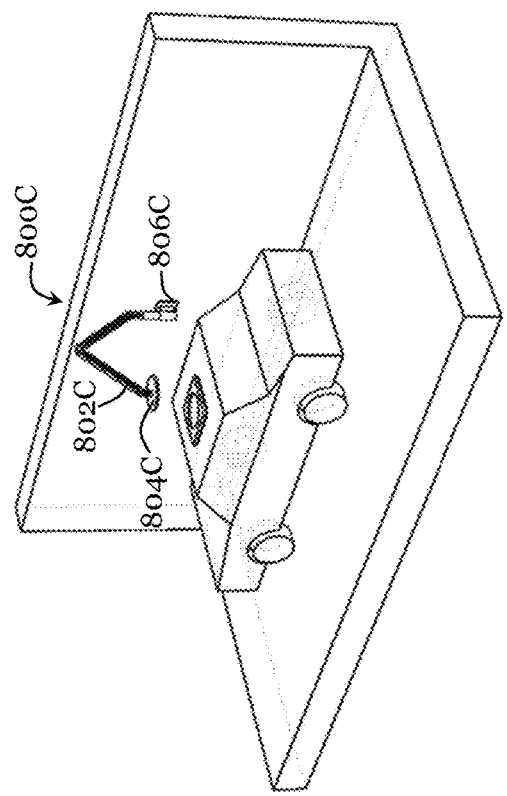
FIG. 8D is a schematic diagram illustrating a charger (charging station) in yet another embodiment of the present invention.

FIG. 8D shows a ceiling-mounted arrangement 800D, which may be manually controlled or electronically controlled. In this example, one end of the mechanical arm 802D holds the transmitter pad 804D while the other end is connected to a movement mechanism 506D on the ceiling. In this example, the mechanical arm 802D can transverse within a specific area as highlighted in the dotted area. The arm 802D may also telescope or move vertically. This arrangement 800D is particularly useful for indoor applications. With an automatically guided system, this arrangement 800D is ideal for indoor parked cars particularly in indoor garages and car parks.

It should be appreciated that the embodiments 800A-800D illustrated in FIGS. 8A-8D are merely exemplary. The movement mechanism of the charger may take other form and shape, without departing from the scope of the invention.

Figure 9:
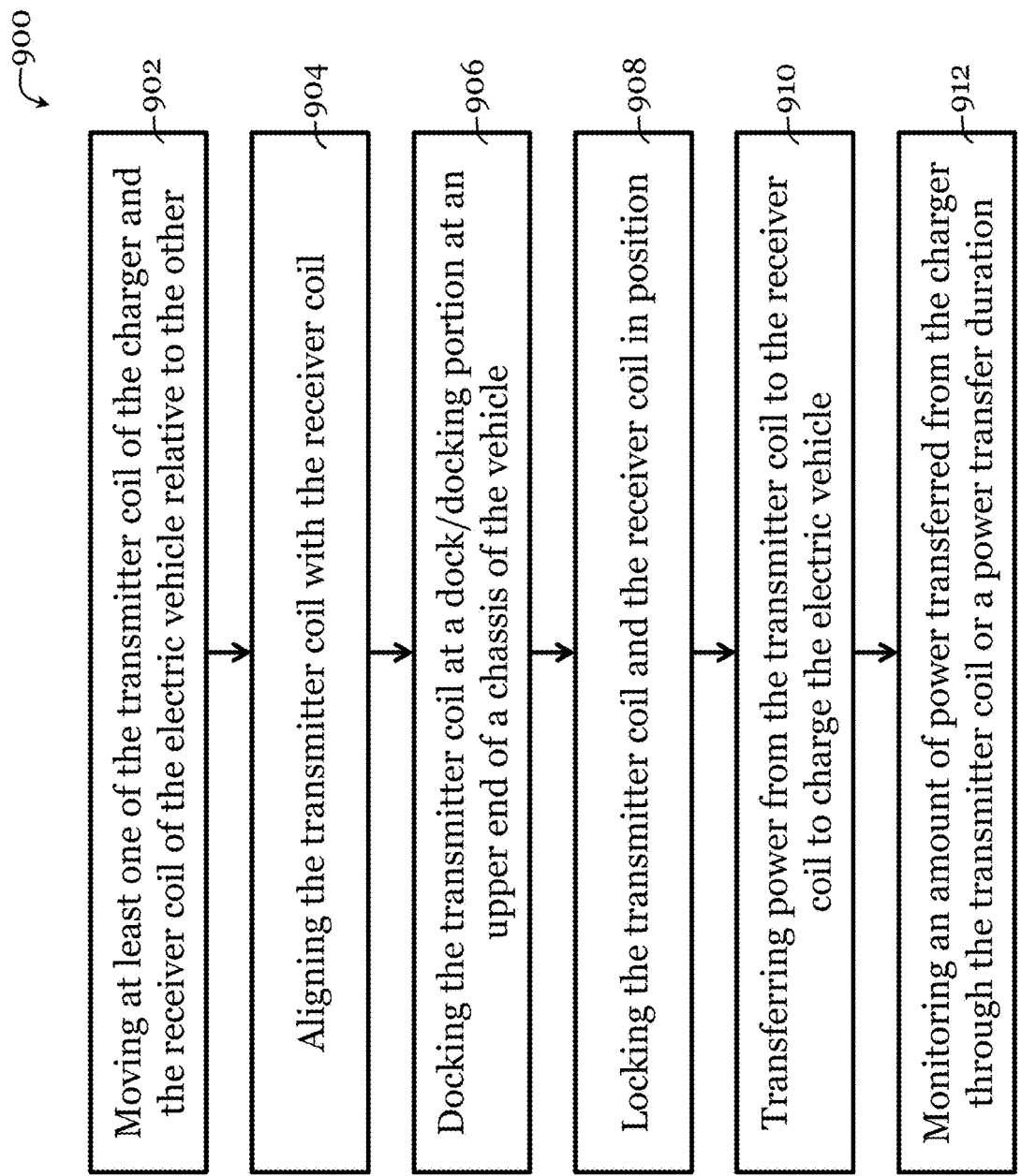
FIG. 9 is a flow diagram illustrating a method for charging an electric vehicle in one embodiment of the present invention.

FIG. 9 illustrates a method 900 for charging an electric vehicle in accordance with one embodiment of the present invention. The method 900 begins from step 902, in which at least one of the transmitter coil of the charger and the receiver coil of the electric vehicle is moved relative to the other. In a preferred embodiment, only the transmitter coil of the charger is moved. The movement of the transmitter coil may be both along a horizontal direction and along a vertical direction, sequentially or simultaneously.

Then, in step 904, the transmitter coil is aligned with the receiver coil. This alignment involves placing the transmitter coil above and proximal to the receiver coil. Preferably, the alignment involves aligning the transmitter coil with the receiver coil such that a spacing between the transmitter coil and the receiver coil is less than 100 mm, preferably less than 50 mm. Additionally, or alternatively, the alignment involves aligning the transmitter coil with the receiver coil such that a central axis defined by the transmitter coil is substantially parallel to, or more preferably, coincide with, a central axis defined by the receiver coil.

The method may further involve step 906, the docking of the transmitter coil at a dock/docking portion at an upper end of a chassis of the vehicle. Optionally, the method involves locking the transmitter coil and the receiver coil in position so that they do not move relative to each other under external influence. The locking may be performed by a mechanical or magnetic locking means arranged on the transmitter pad and/or on the receiver pad or associated chassis portion.

In step 910, subsequently, charging is initiated. Power is transferred from the charger to the electric vehicle, wirelessly through the transmitter coil and the receiver coil, for charging a rechargeable power source arranged in the electric vehicle. In one example, the power is only transferred when a deposit of account is made by the user, e.g., at the charging meter. Additionally or alternatively, the method includes the step of communicating data between the charger and the electric vehicle, wirelessly through the transmitter and receiver coils.

In step 912, the method includes monitoring an amount of power transferred from the charger through the transmitter coil and/or a duration of a power transfer event. In some other examples, the method may further involve identifying the vehicle, and associating the charging event with the identified vehicle.

The method 900 as illustrated in FIG. 9 may be implemented in, for example, the charger embodiments 500, 800A-800D of the present invention, the electric vehicle embodiments 300, 400 of the present invention, or both.

In embodiments of the present invention, the arrangement of the receiver coil at the roof of the chassis allows the transmitter coil of the charger to be guided and placed very closely on top of the receiver coil, thus allowing the transmitter coil and the receiver coil to be separated by a very small gap (a few mm to tens of mm, taking into account the thickness of the transceiver and receiver pads). This arrangement is advantageous in that it allows the transmitter pad can be guided and placed on top of the receiver pad in a manual or automated manner, enabling very high magnetic coupling and reducing magnetic flux leakage and foreign object and human/animal exposure to strong magnetic field. Because of the very small transmission distance (typically tens of millimetres or less, instead of hundreds of millimetres as specified in the SAE 2016 guidelines) between the transmitter and receiver coils, and the high magnetic coupling, a very high energy efficiency (>95% typically) can be achieved.

Also, in order to achieve high quality factor, in the present embodiment, power transfer between the receiver and transmitter coils is conducted at an operating frequency much higher than the ac mains frequency (e.g. 85 kHz for SAE 2016 guidelines for EV and 110 kHz to 205 kHz for the Qi standard launched by the Wireless Power Consortium for portable electronics). The transmitter and receiver pads arrangement in the present invention in ensures that all electric wires (cables) that carry high-frequency voltage and current can be kept to a minimal length in order to minimize voltage drop across the AC impedance of the wires and electromagnetic radiation generated by the wires.

It should be noted that the electric vehicle in the present invention can be a vehicle that operates, e.g., runs, at least partly based on electricity. For example, the electric vehicle may be a pure electric vehicle or a hybrid electric vehicle. The vehicle may be grounded vehicles (such as cars, buses, trucks, and trains), airborne vehicles (aircraft), seaborne vehicles (e.g., ships, sailboats), etc. The vehicle may even be domestic or industrial robots. For example, the vehicles may be a robotic vacuum or a robotic mower. The electric vehicle of the present invention generally includes a chassis, a movement means (e.g., wheels), a drive mechanism (e.g., motor), a rechargeable power source (e.g., batteries), and a charging circuit. The movement means is coupled to the chassis for enabling movement of the electric vehicle. The drive mechanism is operably connected with the movement means for driving the movement means. The rechargeable power source is operably connected with the drive mechanism for power operation of the drive mechanism. The charging circuit is operably connected with the rechargeable power source for charging the rechargeable power source, and the circuit includes, among other circuit components, a receiver coil arranged at an upper end of the chassis for receiving power wirelessly from a transmitter coil of a charger. The vehicles in different embodiments may include further components, depending on their application and function. Although the presented embodiment focus on power transfer, it should be appreciated that data communication may also be enabled between the transmitter and receiver pads/coils.

Embodiments of the present invention provide unique advantages.

First, the arrangement of the receiver coil/pad on the roof of the vehicle chassis facilitates access of the receiver coil/pad by the users or the automated positioning system. Also, such receiver coil/pad is less likely to be hit by debris in the road, especially compared to a bottom mounted receiver coil/pad. The water-proof and electrically-insulated surface of the receiver pad provides improved protection and facilitates easy maintenance. The magnetic field is also located further away from foreign objects and pets on the ground.

Second, the placement of the transmitter coil/pad directly on top of the receiver coil/pad facilitates access of the transmitter coil/pad by the users or the automated positioning system. Also, it reduces misalignment problem, and thus can obtain high energy efficiency. The position of the transmitter coil/pad also allows it to be away from the dirt and dust on the ground, reducing its likeliness of being tramped upon.

Third, because the transmitter coil and receiver coil is separated only by tens of millimeters, a high magnetic coupling coefficient and high energy efficiency can be obtained. Also, there is less magnetic flux leakage and hence the associated problems such as human exposure and heating of nearby foreign objects are reduced. No danger will be posed to pets resting under the vehicle.

The arrangement of a mechanical arm with multiple degrees of freedom in movement, controlled electronically (and preferably automatically) in some embodiments, also facilitates accurate and fast alignment of the transmitter coil with the receiver coil. As such the driver of the vehicle no longer has the burden of having to accurately align the two coils based on markers on the ground. The provision of one or more indicators for indicating operation status of at least one of the transmitter coil or the receiver coil allows the user to readily inspect the status of the charging operation (e.g., when charging is on-going, when charging is completed, when error is encountered, when over-charge event occurs, when over-discharge event occurs, etc.), in particular when the transmitter and receiver pads/coils are engaged.

Embodiments of the present invention also solve the misalignment problem, relax the parking precision requirement, improves safety by reducing human exposure to magnetic field. A charging efficiency of embodiments of the present invention can be more than 95%, resulting in significant cost savings compared with known wireless charging methods. There is also less thermal stress on the insulation material of the vehicle, less energy loss, and improved reliability.

It will be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It should be noted that in the above description, the term "transmitter coil" is not limited to a coil that is arranged to transmit power. In some cases, the "transmitter coil" may also be used as a receiver coil to receiver power. Likewise, the term "receiver coil" is not limited to a coil that is arranged to receive power. In some cases, the "receiver coil" may also be used as a transmitter coil to transmit power.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A charger for an electric vehicle, comprising:
a charging circuit operable to connect with a power supply, the charging circuit including a transmitter coil arranged for wirelessly transferring power to a receiver coil of an electric vehicle to charge the electric vehicle, the transmitter coil being arranged in a transmitter pad, and the receiver coil being arranged in a receiver pad and at an upper end of a chassis of the electric vehicle;
a movement mechanism arranged to enable movement of the transmitter coil for aligning the transmitter coil with the receiver coil; and
an alignment mechanism arranged to facilitate alignment of the transmitter coil with the receiver coil, wherein the alignment mechanism comprises a magnetic member arranged to engage with a complementary metallic or magnetic part of the receiver pad.

2. The charger in accordance with claim 1, further comprising the transmitter pad, and the transmitter pad includes a water-proof layer for water insulation and an electric shield for electrical insulation.

3. The charger in accordance with claim 1, further comprising the transmitter pad, and the transmitter pad comprises an electromagnetic shield for shielding magnetic field generated at the transmitter coil during charging.

4. The charger in accordance with claim 3, wherein the electromagnetic shield is at least partly formed by a magnetic core.

5. The charger in accordance with claim 3, wherein the electromagnetic shield is at least partly formed by a ferromagnetic layer and a conducting layer made of conducting material; the ferromagnetic layer being arranged between the conducting layer and the transmitter coil.

6. The charger in accordance with claim 3, wherein the electromagnetic shield includes a first portion that, during charging operation, is arranged above the transmitter coil relative to a ground.

7. The charger in accordance with claim 6, wherein the electromagnetic shield further includes a second portion extending substantially perpendicular to the first portion, the first and second portions together defining a space that at least partly houses the transmitter coil.

8. The charger in accordance with claim 1, wherein the movement mechanism comprises a mechanical arm, the transmitter coil being arranged at one end of the mechanical arm.

9. The charger in accordance with claim 8, wherein the mechanical arm has at least two degrees of freedom.

10. The charger in accordance with claim 8, wherein the mechanical arm is connected with a mechanical frame that is supported on a ground;
connected with a wall mount; or
suspended from a ceiling.

11. The charger in accordance with claim 1, wherein the alignment mechanism further comprises:
a sensor operable to identify a marker arranged on the chassis and to provide feedback to a controller arranged to control movement of the movement mechanism.

12. The charger in accordance with claim 11, further comprising a controller arranged to control movement of the movement mechanism and wherein the controller is arranged to automatic align of the transmitter coil with the receiver coil based on feedback from the sensor.

13. The charger in accordance with claim 1, wherein the alignment mechanism is arranged to align the transmitter coil with the receiver coil such that one or more of the following conditions are satisfied:
a spacing between the transmitter coil and the receiver coil is less than 100 mm;
a central axis defined by the transmitter coil is substantially parallel to a central axis defined by the receiver coil; and
a central axis defined by the transmitter coil coincide with a central axis defined by the receiver coil.

14. The charger in accordance with claim 1, further comprising a controller arranged to control movement of the movement mechanism.

15. The charger in accordance with claim 14, wherein the controller is arranged to receive manual user input for controlling movement of the movement mechanism.

16. The charger in accordance with claim 1, further comprising a charging meter, operably connected with the charging circuit, for determining at least one of:
an amount of power transferred from the charger through the transmitter coil; and
a duration of a power transfer event.

17. The charger in accordance with claim 1, wherein the transmitter coil is further arranged for wirelessly receiving power from the receiver coil of the electric vehicle to provide power to the power supply to which the charger is operably connected.

18. The charger in accordance with claim 1, further comprising an indicator for indicating an operation status of the transmitter coil.

19. An electric vehicle, comprising:
a chassis;
a movement means coupled with the chassis for enabling movement of the electric vehicle;
a drive mechanism operably connected with the movement means for driving the movement means;
a rechargeable power source operably connected with the drive mechanism for power operation of the drive mechanism; and
a charging circuit operably connected with the rechargeable power source for charging the rechargeable power source, the charging circuit comprises a receiver coil, the receiver coil being arranged in a receiver pad and arranged at an upper end of the chassis, the receiver coil being arranged to receiver power wirelessly from a transmitter coil of a charger, the transmitter coil being arranged in a transmitter pad; and
an alignment member arranged to facilitate alignment of the transmitter coil with the receiver coil, wherein the alignment member comprises a magnetic member arranged to engage with a complementary metallic or magnetic part of the transmitter pad.

20. The electric vehicle in accordance with claim 19, further comprising the receiver pad, and the receiver pad includes a water-proof layer for water insulation and an electric shield for electrical insulation.

21. The electric vehicle in accordance with claim 19, further comprising the receiver pad, and the receiver pad comprises an electromagnetic shield for shielding magnetic field generated at the receiver coil during charging.

22. The electric vehicle in accordance with claim 21, wherein the electromagnetic shield is at least partly formed by a magnetic core.

23. The electric vehicle in accordance with claim 21, wherein the electromagnetic shield is at least partly formed by a ferromagnetic layer and a conducting layer made of conducting material; the ferromagnetic layer being arranged between the conducting layer and the receiver coil.

24. The electric vehicle in accordance with claim 21, wherein the electromagnetic shield includes a portion that, during charging operation, is arranged below the receiver coil relative to a ground.

25. The electric vehicle in accordance with claim 24, wherein the portion is a first portion, and wherein the electromagnetic shield further includes a second portion extending substantially perpendicular to the first portion, the first and second portions together defining a space that at least partly houses the receiver coil.

26. The electric vehicle in accordance with claim 19, wherein receiver coil is arranged in a receiver pad, and the electric vehicle further comprises a dock or docking portion arranged at the upper end of the chassis for receiving or engaging with a transmitter pad of the charger; the receiver pad being arranged at or adjacent the dock or docking portion; the transmitter pad containing the transmitter coil.

27. The electric vehicle in accordance with claim 26, wherein the dock or docking portion comprises a recess or a protrusion on the upper end of the chassis.

28. The electric vehicle in accordance with claim 19, wherein the alignment member further comprises a marker.

29. The electric vehicle in accordance with claim 19, wherein the upper end of the chassis is a roof of the chassis.

30. The electric vehicle in accordance with claim 19, wherein the receiver coil is further arranged to transmit power wirelessly to the transmitter coil of the charger.

31. The electric vehicle in accordance with claim 19, further comprising an indicator arranged to indicate an operation status of the receiver coil.

32. A method for charging an electric vehicle, comprising:
moving at least one of a transmitter coil of a charger and a receiver coil arranged at an upper end of a chassis of an electric vehicle relative to the other; and
aligning, using an alignment mechanism, the transmitter coil with the receiver coil such that the transmitter coil is arranged above and proximal to the receiver coil;
wherein the transmitter coil is arranged in a transmitter pad;
wherein the receiver coil is arranged in a receiver pad; and
wherein the alignment mechanism is arranged to facilitate alignment of the transmitter coil with the receiver coil, and the alignment mechanism comprises a magnetic member arranged in or on the transmitter pad to engage with a complementary metallic or magnetic part of the receiver pad.

* * * * *